(12) United States Patent
Friedemann et al.

(10) Patent No.: US 10,578,128 B2
(45) Date of Patent: Mar. 3, 2020

(54) FLUID PROCESSING SYSTEM

(71) Applicant: GENERAL ELECTRIC COMPANY, Schenectady, NY (US)

(72) Inventors: John Daniel Friedemann, Sandvika (NO); Erik Mele, Sandvika (NO); Albert Erik Johannes Ericsson, Sandvika (NO)

(73) Assignee: General Electric Company, Schenectady, NY (US)

( * ) Notice: Subject to any disclaimer, the term of this patent is extended or adjusted under 35 U.S.C. 154(b) by 609 days.

(21) Appl. No.: 14/833,426

(22) Filed: Aug. 24, 2015

(65) Prior Publication Data
US 2016/0237800 A1 Aug. 18, 2016

Related U.S. Application Data

(63) Continuation-in-part of application No. 14/490,183, filed on Sep. 18, 2014.

(51) Int. Cl.
*F04D 29/58* (2006.01)
*F28D 1/02* (2006.01)
(Continued)

(52) U.S. Cl.
CPC ........ *F04D 29/5806* (2013.01); *E21B 36/001* (2013.01); *E21B 43/36* (2013.01);
(Continued)

(58) Field of Classification Search
CPC ...... F04D 29/5806; F04D 31/00; F04D 17/08; F04D 29/0686; F04D 13/06; F04D 13/08;
(Continued)

(56) References Cited

U.S. PATENT DOCUMENTS 3,384,169 A * 5/1968 Leonard .................. E21B 43/01
166/267
5,181,560 A * 1/1993 Burn ........................ F28F 1/42
122/510
(Continued)

FOREIGN PATENT DOCUMENTS

GB 2456952 A 8/2009
GB 2456953 A 8/2009
(Continued)

OTHER PUBLICATIONS

Sihvo et al., "Fortifying Subsea Wells: A Comparative Analysis of Mainwall Insulation Materials Used in Natural Gas Production", Industry Applications Magazine, IEEE, Nov.-Dec. 2013, vol. 19, Issue: 6, pp. 56-65.
(Continued)

*Primary Examiner* — Alexander B Comley
(74) *Attorney, Agent, or Firm* — Baker Hughes Patent Organization

(57) ABSTRACT

An energy-dissipating device and fluid processing system is provided containing a compressor, a motor, a secondary fluid re-circulation loop, a purge line, and a fluid conduit. The compressor is configured to receive a hot fluid including condensable and non-condensable components, and produce therefrom a primary compressed fluid stream and a secondary fluid stream. The motor is configured to drive the compressor and for ingress and egress of the secondary fluid stream. The secondary fluid re-circulation loop is configured to control an operating temperature of the motor. The secondary fluid re-circulation loop includes a first energy-dissipating device configured to remove excess heat from the secondary fluid stream. The purge line separates a first portion of the secondary fluid stream in the fluid re-circulation loop from a second portion of the secondary fluid
(Continued)

stream being returned to the motor. The fluid conduit receives the primary compressed fluid stream from the compressor.

14 Claims, 13 Drawing Sheets

(51) Int. Cl.
    *F28F 9/02*     (2006.01)
    *F04D 25/06*     (2006.01)
    *E21B 43/36*     (2006.01)
    *E21B 36/00*     (2006.01)
    *F04D 13/08*     (2006.01)
    *B01D 19/00*     (2006.01)
    *F28D 21/00*     (2006.01)
    *F04D 31/00*     (2006.01)
    *F04D 17/08*     (2006.01)

(52) U.S. Cl.
    CPC ....... *F04D 13/086* (2013.01); *F04D 25/0686* (2013.01); *F04D 29/5826* (2013.01); *F04D 29/5866* (2013.01); *F28D 1/022* (2013.01); *F28F 9/0265* (2013.01); *F28F 9/0275* (2013.01); *B01D 19/0068* (2013.01); *B01D 19/0073* (2013.01); *F04D 17/08* (2013.01); *F04D 31/00* (2013.01); *F28D 2021/004* (2013.01); *F28F 9/02* (2013.01)

(58) Field of Classification Search
    CPC ........ F04D 13/086; F04D 13/10; F04D 25/06; F04D 25/0686; F04D 27/009; F04D 29/29; F04D 29/5826–584; F04D 29/5866–588; E21B 36/001; E21B 3/36; F04B 15/04; F04B 17/03; F04B 19/06; F04B 35/04; F04B 37/20; F04B 47/06; F04B 53/08; F28F 9/022; F28F 9/0265; F28F 9/0275
    USPC ............................ 165/45, 173, 174; 166/357
    See application file for complete search history.

(56) References Cited

U.S. PATENT DOCUMENTS

| | | |
|---|---|---|
| 6,656,366 B1 | 12/2003 | Fung et al. |
| 8,622,067 B2 | 1/2014 | Friedemann et al. |
| 2004/0031596 A1* | 2/2004 | Nishida ............... B60H 1/3227 165/140 |
| 2004/0069469 A1* | 4/2004 | Kato ................... F28D 1/05366 165/151 |
| 2007/0029091 A1* | 2/2007 | Stinessen ............... E21B 43/01 166/357 |
| 2007/0119962 A1 | 5/2007 | Peckham et al. |
| 2009/0020288 A1 | 1/2009 | Balkanyi et al. |
| 2009/0145591 A1* | 6/2009 | Rericha .................. B63H 21/10 165/174 |
| 2009/0200035 A1 | 8/2009 | Bjerkreim et al. |
| 2009/0277612 A1 | 11/2009 | Poorte et al. |
| 2010/0006291 A1 | 1/2010 | Poorte |
| 2010/0252227 A1* | 10/2010 | Sten-Halvorsen .... E21B 36/001 165/45 |
| 2011/0048546 A1 | 3/2011 | Bjorge et al. |
| 2011/0100589 A1* | 5/2011 | Van Der Rest ......... F28D 1/022 165/45 |
| 2012/0097362 A1* | 4/2012 | Kanstad ................ E21B 36/001 165/45 |
| 2012/0103188 A1* | 5/2012 | Stinessen ................ E21B 43/34 95/24 |
| 2012/0298343 A1* | 11/2012 | Irmann-Jacobsen ........................ E21B 36/001 165/173 |
| 2013/0136629 A1* | 5/2013 | Maier ................... F04D 17/122 417/366 |

FOREIGN PATENT DOCUMENTS

| | | |
|---|---|---|
| GB | 2456954 A | 8/2009 |
| WO | 2011112102 A1 | 9/2011 |
| WO | 2012151635 A1 | 11/2012 |
| WO | 2013002644 A1 | 1/2013 |
| WO | 2013004277 A1 | 1/2013 |
| WO | 2013023948 A2 | 2/2013 |
| WO | 2013125960 A1 | 8/2013 |

OTHER PUBLICATIONS

Sihvo et al., "High voltage machine mainwall insulation material behavior when exposed to raw natural gas", Electrical Machines (ICEM), 2010 XIX International Conference on, Sep. 6-8, 2010, pp. 1-6, Rome.

Jean-Francois Cam, "Subsea innovations make complex Islay tie-back possible", 70 &72 Offshore Magazine, Feb. 2012.

Gyllenhammar et al., "Evaluation of Process Cooling in Subsea Separation, Boosting and Injection Systems (SSBI)", Norwegian University of Science and Technology Department of Energy and Process Engineering, pp. 1-102, Jun. 2012.

* cited by examiner

FLUID PROCESSING SYSTEM

CROSS REFERENCE TO RELATED APPLICATIONS

This application is a Continuation-In-Part of and claims priority from U.S. patent application Ser. No. 14/490,183 filed on 18 Sep. 2014, and which is incorporated by reference herein in its entirety.

BACKGROUND

The present invention relates to fluid processing systems for deployment in subsea environments, and energy-dissipating devices used in such fluid processing systems.

Fluid processing systems used for hydrocarbon production in subsea environments typically include a main separator assembly and a heat exchange system disposed upstream relative a compressor. The heat exchange system reduces temperature of a multiphase fluid extracted from a subsea hydrocarbon reservoir. The main separator assembly receives the multiphase fluid from the heat exchange system and separates gaseous components from liquid components of the multiphase fluid.

In such fluid processing systems motors may be provided to drive one or more compressors needed to boost gaseous multiphase fluid components from the subsea production installation to a distant storage facility. The relatively cold temperature of the subsurface environment notwithstanding, motors used in subsurface installations are prone to damage caused by overheating. Typically, the temperature of an operating motor is controlled by circulating a coolant fluid within the motor and exchanging extracted heat with the ambient subsea environment. Various attempts have been made to use multiphase production fluids as the motor coolant. However, the variability of production fluid compositions, temperatures and pressures, may limit the utility of such a cooling strategy.

Thus, while the use of a multiphase production fluid as a motor coolant in a hydrocarbon subsurface production installation is an alluring prospect, important technical refinements have heretofore been lacking or deficient and further innovation required.

Despite the impressive achievement made to date, there remains a need for improved fluid processing systems for more efficiently handling a multiphase fluid being produced from a subsea environment as well as improved energy-dissipating devices for use in such fluid processing systems.

BRIEF DESCRIPTION

In one embodiment, the present invention provides a fluid processing system comprising: (a) a compressor configured to receive a hot fluid comprising condensable and non-condensable components, and produce therefrom a primary compressed fluid stream and a secondary fluid stream; (b) a motor configured to drive the compressor, the motor being configured for ingress and egress of the secondary fluid stream; (c) a secondary fluid re-circulation loop configured to control an operating temperature of the motor, the secondary fluid re-circulation loop comprising a first energy-dissipating device configured to remove excess heat from the secondary fluid stream, the first energy dissipating device comprising (i) an inlet header, (ii) an outlet header, (iii) a plurality of heat exchange tubes, and (iv) at least one passive gas-liquid separator; (d) a purge line configured to separate a first portion of the secondary fluid stream in the fluid re-circulation loop from a second portion of the secondary fluid stream being returned to the motor; and (e) a fluid conduit configured to receive the primary compressed fluid stream from the compressor.

In another embodiment, the present invention provides a fluid processing system comprising: (a) a compressor configured to receive a hot fluid comprising condensable and non-condensable components, and produce therefrom a primary compressed fluid stream and a secondary fluid stream; (b) a first energy-dissipating device configured to receive the secondary fluid stream and produce therefrom a tertiary fluid stream having a lower temperature than the secondary fluid stream; (c) a motor configured to drive the compressor, the motor being configured for ingress and egress of the tertiary fluid stream; (d) a tertiary fluid re-circulation loop configured to control an operating temperature of the motor, the tertiary fluid re-circulation loop comprising a second energy-dissipating device configured to remove excess heat from the tertiary fluid stream, the second energy dissipating device comprising (i) an inlet header, (ii) an outlet header, (iii) a plurality of heat exchange tubes, and (iv) at least one passive gas-liquid separator; (e) a purge line configured to separate a first portion of the tertiary fluid stream in the fluid re-circulation loop from a second portion of the tertiary fluid stream being returned to the motor; and (f) a fluid conduit configured to receive the primary compressed fluid stream from the compressor.

In yet another embodiment, the present invention provides a method comprising: (a) introducing a hot fluid comprising condensable and non-condensable components into a compressor to produce a primary compressed fluid stream and a secondary fluid stream;(b) feeding the secondary fluid stream from the compressor to a motor configured to drive the compressor, to control an operating temperature of the motor; (c) circulating the secondary fluid stream in a secondary fluid re-circulation loop configured to receive the secondary fluid stream from the motor, the secondary fluid re-circulation loop comprising an energy-dissipating device configured to remove excess heat from the secondary fluid stream, the first energy dissipating device comprising (i) an inlet header, (ii) an outlet header, (iii) a plurality of heat exchange tubes, and (iv) at least one passive gas-liquid separator; (d) separating a first portion of the secondary fluid stream from a second portion of the secondary fluid stream via a purge line; (e) re-circulating the second portion of the secondary fluid stream to the motor; and (f) transporting the primary compressed fluid stream from the compressor to a fluid storage facility via a fluid conduit.

In yet another embodiment, the present invention provides an energy-dissipating device comprising (i) an inlet header, (ii) an outlet header, (iii) a plurality of heat exchange tubes, and (iv) at least one passive gas-liquid separator; wherein the at least one passive gas-liquid separator is disposed within one or more of the heat exchange tubes and the outlet header.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a new configuration of a fluid processing system for efficiently moving multiphase fluid being produced from a subsea hydrocarbon reservoir to a distant fluid storage facility. The fluid processing system of the present invention comprises an energy-dissipating device disposed upstream and/or downstream relative to a compressor and a fluid re-circulation loop. The energy-dissipating device comprises at least one at least one passive gas-liquid separator, but may further comprise one or more of a heat exchange sub-system, a work extraction device, and a pressure changing device, which may or may not effect the passive separation of the gaseous and liquid components of the fluid being processed. The energy-dissipating device is configured to remove excess heat from a fluid stream and produce therefrom a first portion of a heat depleted fluid stream enriched in condensable components and a second portion of the heat depleted fluid stream depleted in condensable components. The re-circulation loop is configured to control an operating temperature of a motor configured to drive the compressor, by re-circulating the second portion of the heat depleted fluid stream to the motor.

Figure 1:
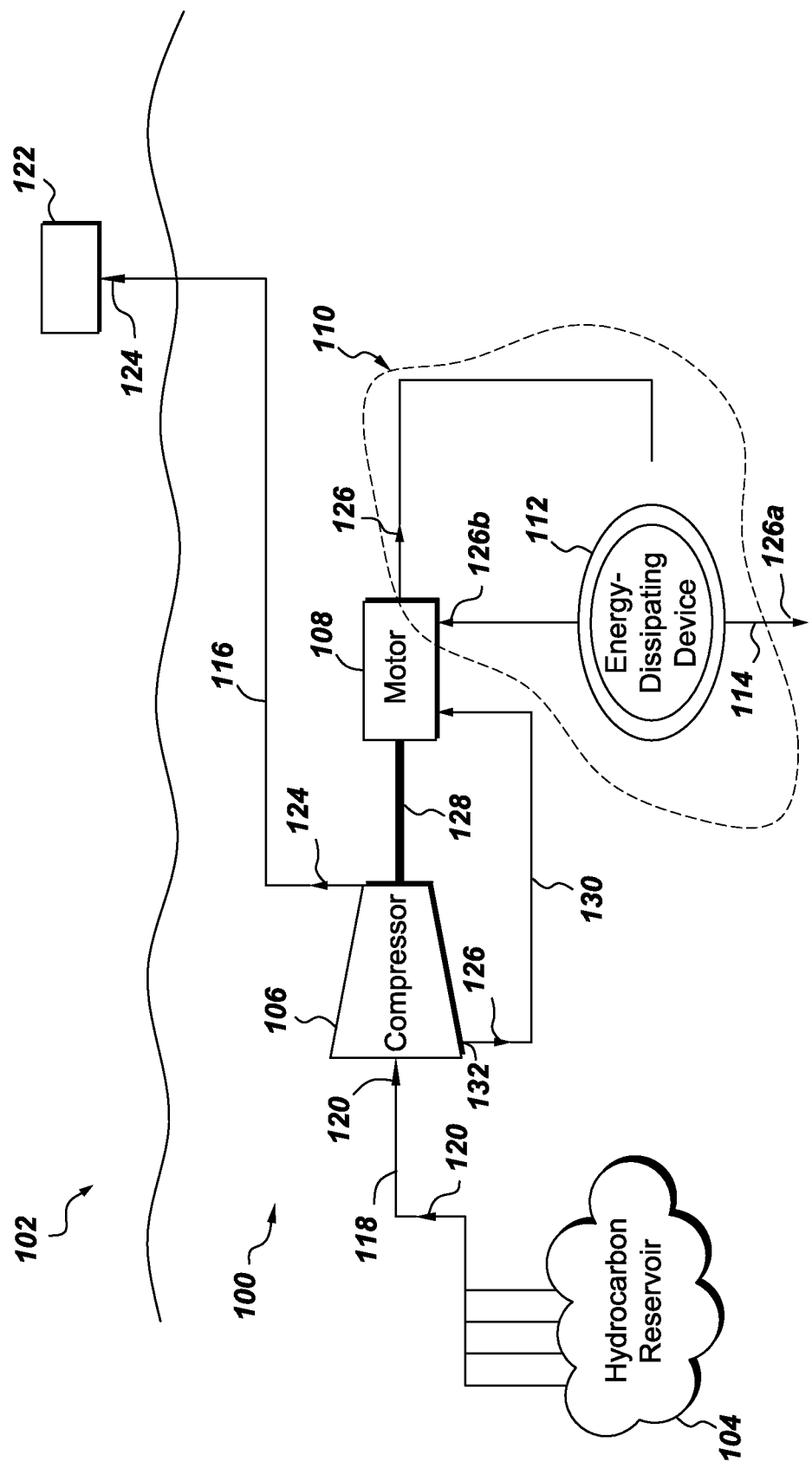
FIG. 1 illustrates a schematic view of a fluid processing system in accordance with an exemplary embodiment of the present invention.

FIG. 1 represents a fluid processing system 100 deployed in a subsea environment 102. The fluid processing system 100 may be located at depths reaching several thousands of meters within a cold ambient environment and proximate to a subsea hydrocarbon reservoir 104. In one embodiment, the fluid processing system 100 includes a compressor 106, a motor 108, a secondary fluid re-circulation loop 110, an energy-dissipating device 112, a purge line 114, and a fluid conduit 116. The fluid processing system 100 further includes an import line 118, at times herein referred to as a feed line 118, coupled to the compressor 106. The fluid processing system 100 is configured to move a hot fluid 120, for example, a crude multiphase hydrocarbon fluid, being produced from the subsea hydrocarbon reservoir 104 to a distant fluid storage facility 122 more efficiently than using known production techniques.

The compressor 106 receives the hot fluid 120 from the subsea hydrocarbon reservoir 104 via the import line 118. The hot fluid 120 is typically a mixture of a hot gaseous fluid and a hot liquid fluid. The hot fluid 120 includes condensable components such as moisture and low molecular weight hydrocarbons, and non-condensable components such as the gases, $CH_4$, $CO_2$ and $H_2S$. The compressor 106 is a wet gas compressor and is configured to compress the hot fluid 120 saturated with one or more condensable components and produce therefrom a primary compressed fluid stream 124 and a secondary fluid stream 126. The motor 108 is coupled to the compressor 106 via a shaft 128, and is configured to drive the compressor 106. In one or more embodiments, suitable compressors 106 include positive displacement compressors and centrifugal compressors.

The compressor 106 discharges the secondary fluid stream 126 to the motor 108 via a conduit 130. In one embodiment, the secondary fluid stream 126 may be discharged from an initial stage 132 of the compressor 106. The secondary fluid stream 126 is circulated within the motor 108, and is discharged from the motor 108 to the secondary fluid re-circulation loop 110. The secondary fluid stream 126 acts to cool the motor 108 while circulating within it.

The secondary fluid re-circulation loop 110 includes the energy-dissipating device 112 which receives the secondary fluid stream 126 from the motor 108. The energy-dissipating device 112 removes excess heat (i.e. heat extracted from the motor 108) from the secondary fluid stream 126 and produces a first portion 126a of the secondary fluid stream 126, and a second portion 126b of the secondary fluid stream 126. The first portion 126a is primarily a condensate, and the second portion 126b is primarily a gaseous fluid stream. In general, the first portion 126a is enriched in condensable components and the second portion 126b is depleted in condensable components. In one embodiment, the first portion 126a is discharged from the purge line 114 into the feed line 118, at times herein referred to as import line 118. Feed line may be referred alternatively as "a low pressure sink" or "a low pressure destination". In certain other embodiments, the first portion 126a may be transported to a high pressure sink such as the outlet fluid conduit 116 located downstream of the compressor 106, through a boosting device (not shown in FIG. 1) disposed within the purge line 114.

In one embodiment, the energy-dissipating device 112 is a heat exchange sub-system comprising at least one passive gas-liquid separator. Suitable gas-liquid separators include cyclone separators, plate separators, and the like. Energy dissipating device 112 is configured to remove excess heat from the secondary fluid stream 126 by condensing at least a portion of the condensable components in the secondary fluid stream 126 and produce therefrom stream 126a enriched in condensable components and stream 126b depleted in condensable components. In one or more embodiments, the heat exchange sub-system may have an inlet header, an outlet header, and a plurality of heat exchange tubes. In such embodiments, the inlet header may receive the secondary fluid stream 126 discharged from the motor 108, circulate the secondary fluid stream 126 within the plurality of heat exchange tubes so as to exchange heat with the cold ambient environment, and condense at least a portion of the condensable components to produce therefrom stream 126a and stream 126b. Further, the plurality of heat exchange tubes may discharge streams 126a and 126b to the outlet header including a passive liquid-gas separator for separating the first stream 126a from stream 126b. In certain other embodiments, the heat exchange sub-system may include a plurality of heat exchange tubes and a passive gas-liquid separator may be disposed along a length one or more of the tubes. In such embodiments, the plurality of heat exchange tubes may receive the secondary fluid stream 126 discharged from the motor 108, cool the secondary fluid stream 126 and produce therefrom stream 126a and stream 126b, and separate stream 126a from stream 126b through the agency of the one or more passive gas-liquid separators disposed within the tubes.

In another embodiment, the energy-dissipating device 112 comprises a work extraction device configured to remove heat from the secondary fluid stream 126 by expanding the secondary fluid stream 126 and produce therefrom the first portion 126a and the second portion 126b. Suitable work extraction devices include turbo-expanders, hydraulic expanders, and hydraulic motors. In yet another embodiment, the energy-dissipating device 112 comprises a pressure changing device configured to remove heat from the secondary fluid stream 126 by reducing pressure of the secondary fluid stream 126 and/or increasing friction in a flow of the secondary fluid stream 126 and produce therefrom the first portion 126a and the second portion 126b. In one embodiment, the pressure changing device is a throttle valve. As noted, the pressure changing device may also comprise a frictional loss device. Such work extraction devices and pressure changing devices may constitute suitable passive gas-liquid separators according to one or more embodiments of the present invention.

The purge line 114 coupled to the energy-dissipating device 112 separates the first portion 126a of the secondary fluid stream 126 from the second portion 126b of the secondary fluid stream 126. The purge line 114 may include a passive gas-liquid separator (not shown in FIG. 1) for separating the first portion 126a of the secondary fluid stream 126 from the second portion 126b of the secondary fluid stream 126. In one or more embodiments, the passive gas-liquid separator includes one or more weir separators, filter separators, cyclone separators, sheet metal separators, or a combination of two or more of the foregoing separators.

In one or more embodiments, the first portion 126a of the secondary fluid stream 126 may be safely discharged from the fluid processing system 100 into the subsea environment 102, for example, in instances wherein the first portion 126a is comprised of environmentally benign components such as water and/or carbon dioxide. In some other embodiments, the purge line 114 may deliver the first portion 126a to a feed line 118 disposed upstream relative to the compressor 106. Similarly, in the illustrated embodiment, the second portion 126b is re-circulated to the motor 108 via the re-circulation loop 110 so as to control the operating temperature of the motor 108.

The outlet fluid conduit 116 is coupled to the compressor 106 for receiving the primary compressed fluid stream 124 from the compressor 106 and directing the primary compressed fluid stream 124 to the distant fluid storage facility 122.

Figure 2:
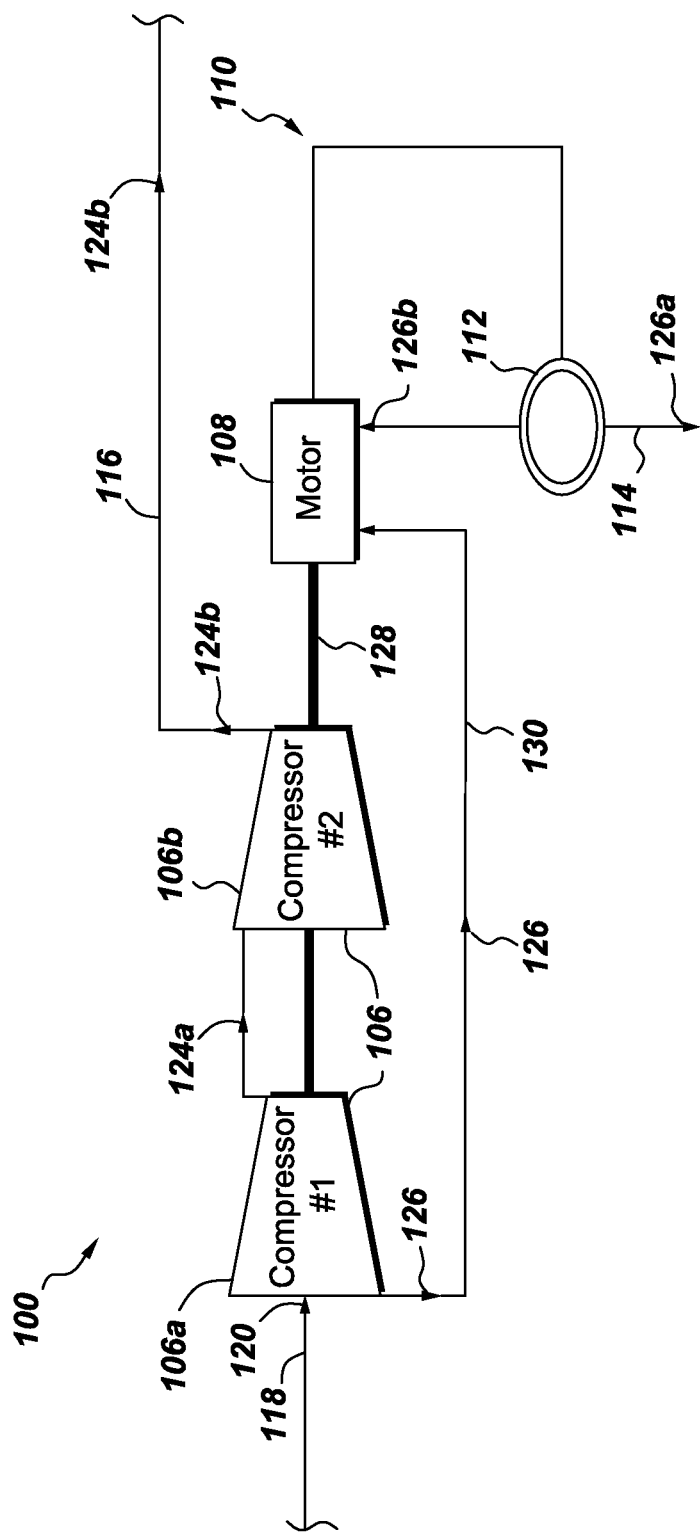
FIG. 2 illustrates a schematic view of a fluid processing system in accordance with an exemplary embodiment of the present invention.

FIG. 2 represents the fluid processing system 100 having a plurality of compressors 106 in accordance with the exemplary embodiment of FIG. 1. The plurality of compressors 106 includes a first compressor 106a and a second compressor 106b deployed in series via the shaft 128 coupled to the motor 108.

In the illustrated embodiment, the first compressor 106a receives the hot fluid 120 from the subsea hydrocarbon reservoir 104 (as shown in FIG. 1) via the import line 118. The first compressor 106a is configured to compress the hot fluid 120 and produce therefrom a first primary compressed fluid stream 124a and the secondary fluid stream 126. The first compressor 106a is driven by the motor 108 via the shaft 128. The first primary compressed fluid stream 124a is fed to the second compressor 106b for further compression of the first primary compressed fluid stream 124a. The motor 108 is configured for ingress and egress of the secondary fluid stream 126. The second compressor 106b is also driven by the motor 108 via the shaft 128. The second compressor 106b produces a second primary compressed fluid stream 124b which is directed to the distant fluid storage facility 122 (as shown in FIG. 1) via the outlet fluid conduit 116.

Figure 3:
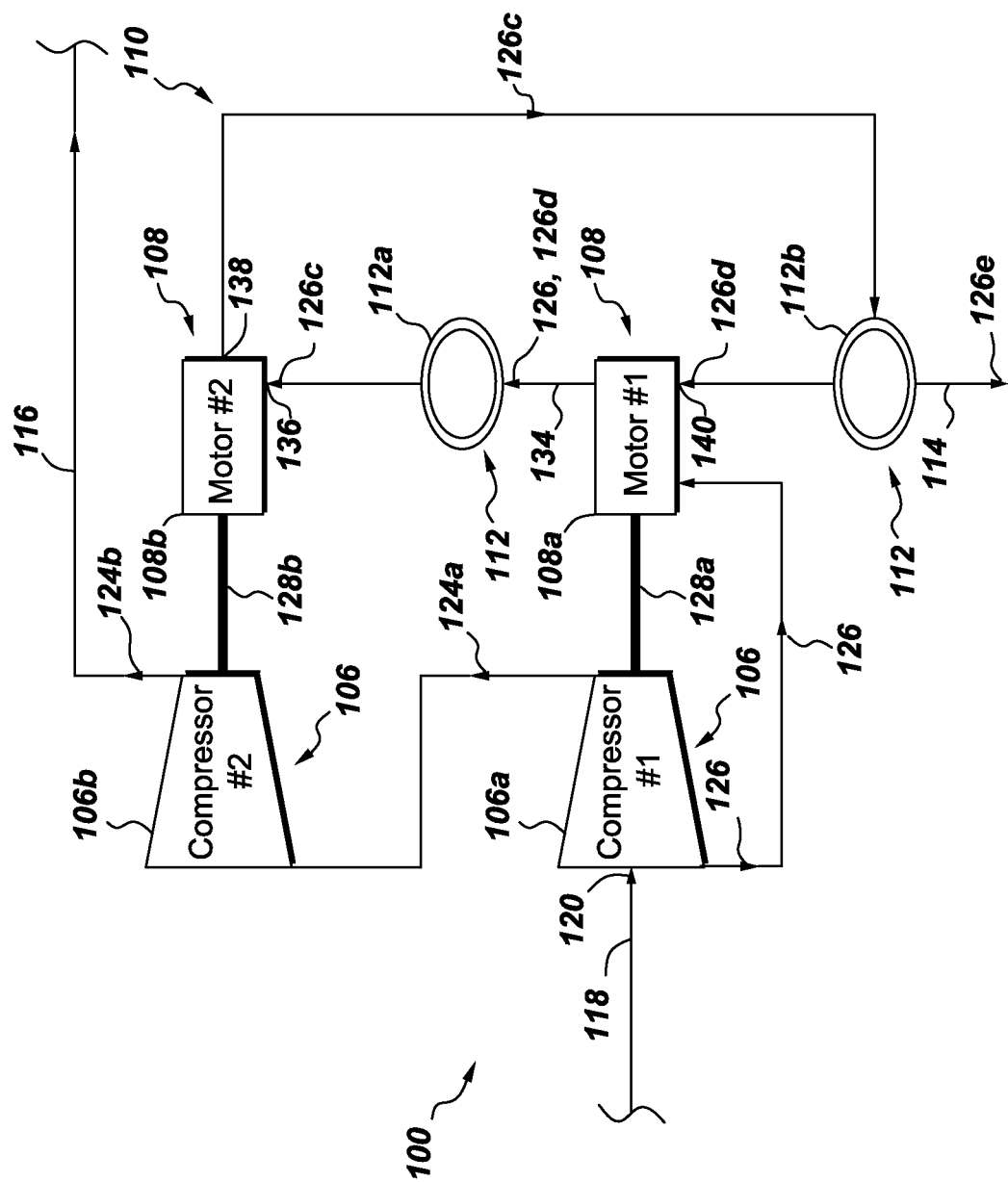
FIG. 3 illustrates a schematic view of a fluid processing system in accordance with an exemplary embodiment of the present invention.

FIG. 3 represents the fluid processing system 100 having the plurality of compressors 106, a plurality of motors 108, and a plurality of energy-dissipating devices 112 in accordance with the exemplary embodiments of FIGS. 1 and 2. The plurality of compressors 106 includes the first compressor 106a coupled to a first motor 108a via a first shaft 128a, and the second compressor 106b coupled to a second motor 108b via a second shaft 128b. In the embodiment shown, the first and second compressors 106a, 106b are deployed in series.

In the illustrated embodiment, the secondary fluid re-circulation loop 110 is disposed between the first motor 108a and the second motor 108b. The secondary fluid re-circulation loop 110 includes a first energy-dissipating device 112a deployed between a re-circulation outlet 134 of the first motor 108a and a re-circulation inlet 136 of the second motor 108b, and a second energy-dissipating device 112b deployed between a re-circulation outlet 138 of the second motor 108b and a re-circulation inlet 140 of the first motor 108a. The first motor 108a is configured for ingress and egress of the secondary fluid stream 126. The first energy-dissipating device 112a receives the secondary fluid stream 126 from the first motor 108a and removes excess heat from the secondary fluid stream 126 and produces therefrom a stream 126c of the secondary fluid stream 126. The second motor 108b is configured for ingress and egress of the stream 126c. The second energy-dissipating device 112b receives the stream 126c via the second motor 108b and removes excess heat from the stream 126c to produce therefrom a stream 126d of the secondary fluid stream 126 depleted in condensable components and a stream 126e of the secondary fluid stream 126 enriched in condensable components. The stream 126d is separated from the stream 126e via the purge line 114 so as to feed the stream 126d to the first motor 108a and discharge the stream 126e.

Figure 4:
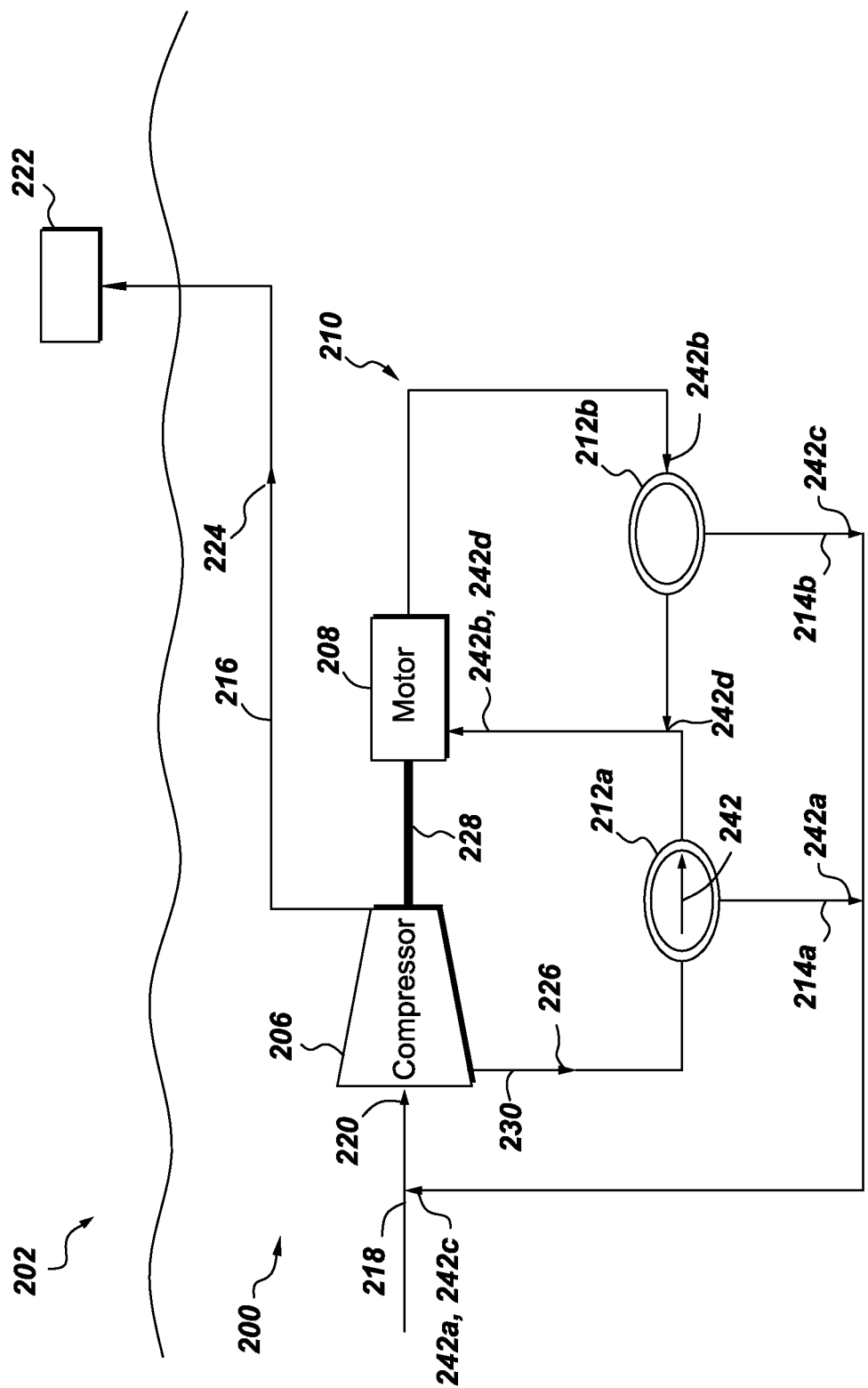
FIG. 4 illustrates a schematic view of a fluid processing system in accordance with an exemplary embodiment of the present invention.

FIG. 4 represents a subsea fluid processing system 200 in accordance with another exemplary embodiment. The fluid processing system 200 includes a compressor 206, a motor 208, a tertiary fluid re-circulation loop 210, a first energy-dissipating device 212a, a second energy-dissipating device 212b, a first purge line 214a, a second purge line 214b, and a fluid conduit 216.

The compressor 206 receives the hot fluid 220 from the subsea hydrocarbon reservoir (as shown in FIG. 1) via an import line 218. The compressor 206 is configured to compress the hot fluid 220 and produce therefrom a primary compressed fluid stream 224 and a secondary fluid stream 226. The motor 208 is coupled to the compressor 206 via a shaft 228, and is configured to drive the compressor 206 so as to compress the hot fluid 220.

The compressor 206 discharges the secondary fluid stream 226 to the first energy-dissipating device 212a via a conduit 230. The first energy-dissipating device 212a removes excess heat from the secondary fluid stream 226 and produces therefrom a tertiary fluid stream 242 having a lower temperature than the secondary fluid stream 226. The tertiary fluid stream 242 includes a first portion 242a enriched in condensable components and a second portion 242b depleted in condensable components. The first purge line 214a separates the first portion 242a from the second portion 242b. In one embodiment, the motor 208 is configured for ingress and egress of the second portion 242b. The second portion 242b is circulated within the motor 208, acts to cools the motor 208, and is discharged from the motor 208 into the tertiary fluid re-circulation loop 210.

The tertiary fluid re-circulation loop 210 includes the second energy-dissipating device 212b configured to receive the second portion 242b. The second energy-dissipating device 212b removes excess heat extracted from the motor 208 from the second portion 242b and produces a third portion 242c of the tertiary fluid stream 242, and a fourth portion 242d of the tertiary fluid stream 242. In one embodiment, the portions 242a and 242c include a condensate, and the portions 242b and 242d include a gaseous fluid stream depleted in condensable components. Specifically, the portions 242a and 242c are enriched in condensable components and the portions 242b and 242d are depleted in condensable components.

The second purge line 214b coupled to the second energy-dissipating device 212b separates the third portion 242c from the fourth portion 242d. In the illustrated embodiment, the first portion 242a discharged via the first purge line 214a and the third portion 242c discharged via the second purge line 214b are combined and delivered to a feed line 218 disposed upstream relative to the compressor 206. In the illustrated embodiment, the portions 242a and 242c are discharged from the purge lines 214a and 214b to the feed line 218, which may alternatively be referred as "a low pressure sink" or "a low pressure destination". In certain other embodiments, the portions 242a, 242c may be transported to a high pressure sink such as the outlet fluid conduit 216 located downstream of the compressor 206, through a boosting device (not shown in FIG. 4) disposed within the purge lines 214a and 214b. Similarly, in the illustrated embodiment at steady state a mixture of the second portion 242b along with the fourth portion 242d is circulated through the motor 208 via the tertiary fluid re-circulation loop 210. In one embodiment, the tertiary fluid re-circulation loop 210 functions to control an operating temperature of the motor 208.

The outlet fluid conduit 216 is coupled to the compressor 206 for receiving the primary compressed fluid stream 224 from the compressor 206 and directing the primary compressed fluid stream 224 to a fluid storage facility 222.

Figure 5:
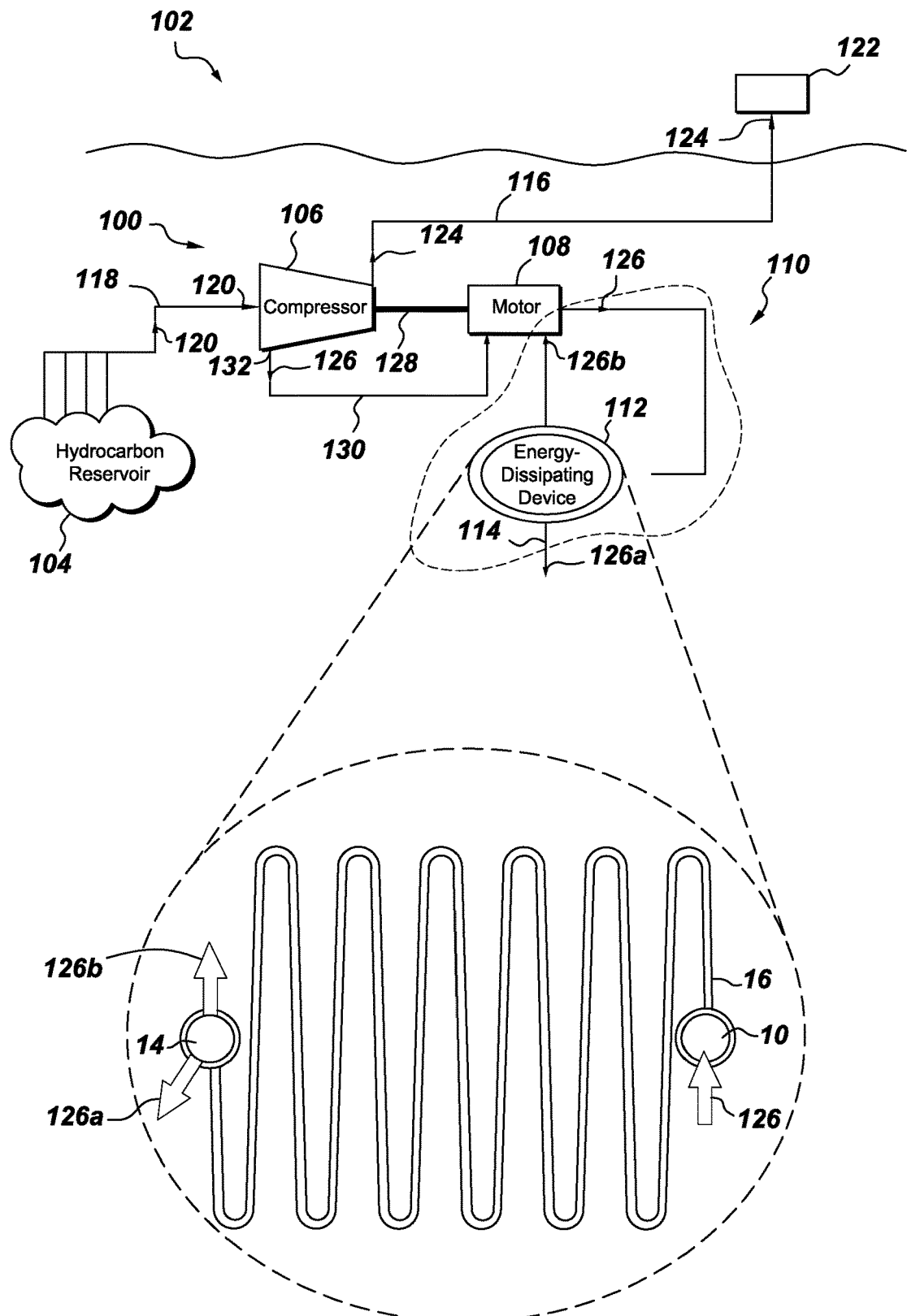
FIG. 5 illustrates a schematic view of a fluid processing system and energy dissipating device in accordance with an exemplary embodiment of the present invention.

Referring to FIG. 5, the figure represents a fluid processing system 100 provided by the present invention and comprising a first energy dissipating device 112 comprising an inlet header 10, an outlet header 14, a plurality of heat exchange tubes 16, and at least one passive gas-liquid separator (not shown in FIG. 5, but see FIGS. 7-13). The system is configured such that a secondary fluid stream 126 discharged from motor 108 enters secondary fluid recirculation loop 110 and encounters inlet header 10 where it is distributed to a plurality of heat exchange tubes configured for contact with a cold subsea ambient environment. The heat exchange tubes 16 are coupled to and in fluid communication with outlet header 14. As noted, the system comprises at least one passive gas-liquid separator 12 disposed within a heat exchange tube and/or the outlet header. In one embodiment, a passive gas-liquid separator 12 is disposed within each of the heat exchange tubes. In an alternate embodiment, a passive gas-liquid separator is disposed within two or more of the heat exchange tubes. In yet another embodiment, passive gas-liquid separators are disposed within two or more of the heat exchange tubes and the outlet header. In yet still another embodiment, each heat exchange tube comprises a passive gas-liquid separator and the outlet header also comprises at least one passive gas-liquid separator. Through the action of the heat exchange tubes and the one or more gas-liquid separators, secondary fluid stream 126 is separated into a heat depleted fluid stream 126a enriched in condensable components and a heat depleted fluid stream 126b depleted in condensable components. As noted, heat depleted fluid stream 126b is suitable for use as a coolant for motor 108 which is configured to drive system compressor 106. In the embodiment shown, a purge line 114 is configured to conduct heat depleted fluid stream 126a enriched in condensable components to one or more other system components, for example fluid conduit 116 and/or feed line 118.

Figure 6:
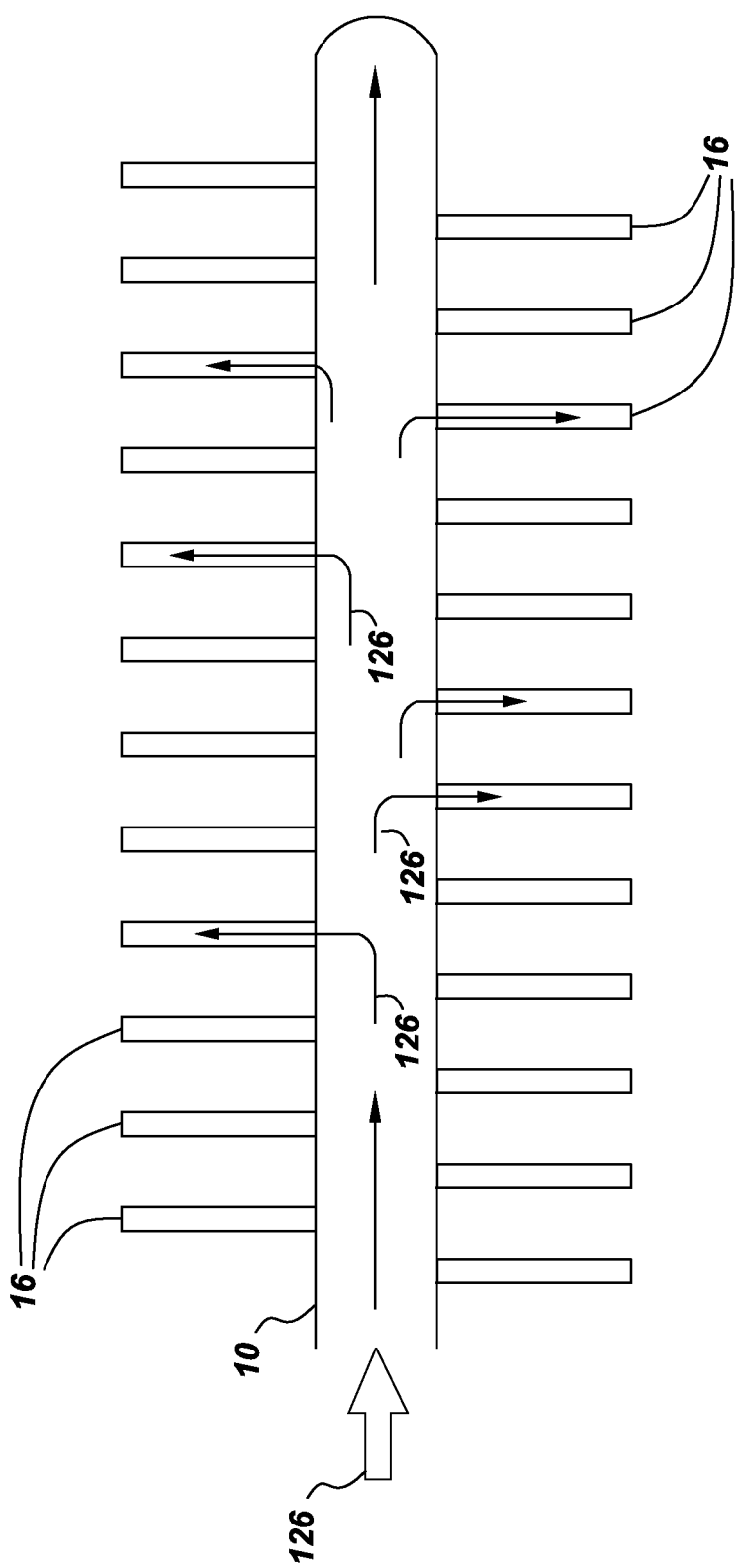
FIG. 6 illustrates a schematic view of a portion of an energy dissipating device in accordance with the exemplary embodiment of the present invention.

FIG. 6 represents an inlet header 10 suitable for use according to one or more embodiments of the present invention. Inlet header 10 is configured such that a secondary fluid stream 126 enters the header and is distributed to a plurality of heat exchange tubes 16 in fluid communication with a similarly configured outlet header 14.

Figure 7:
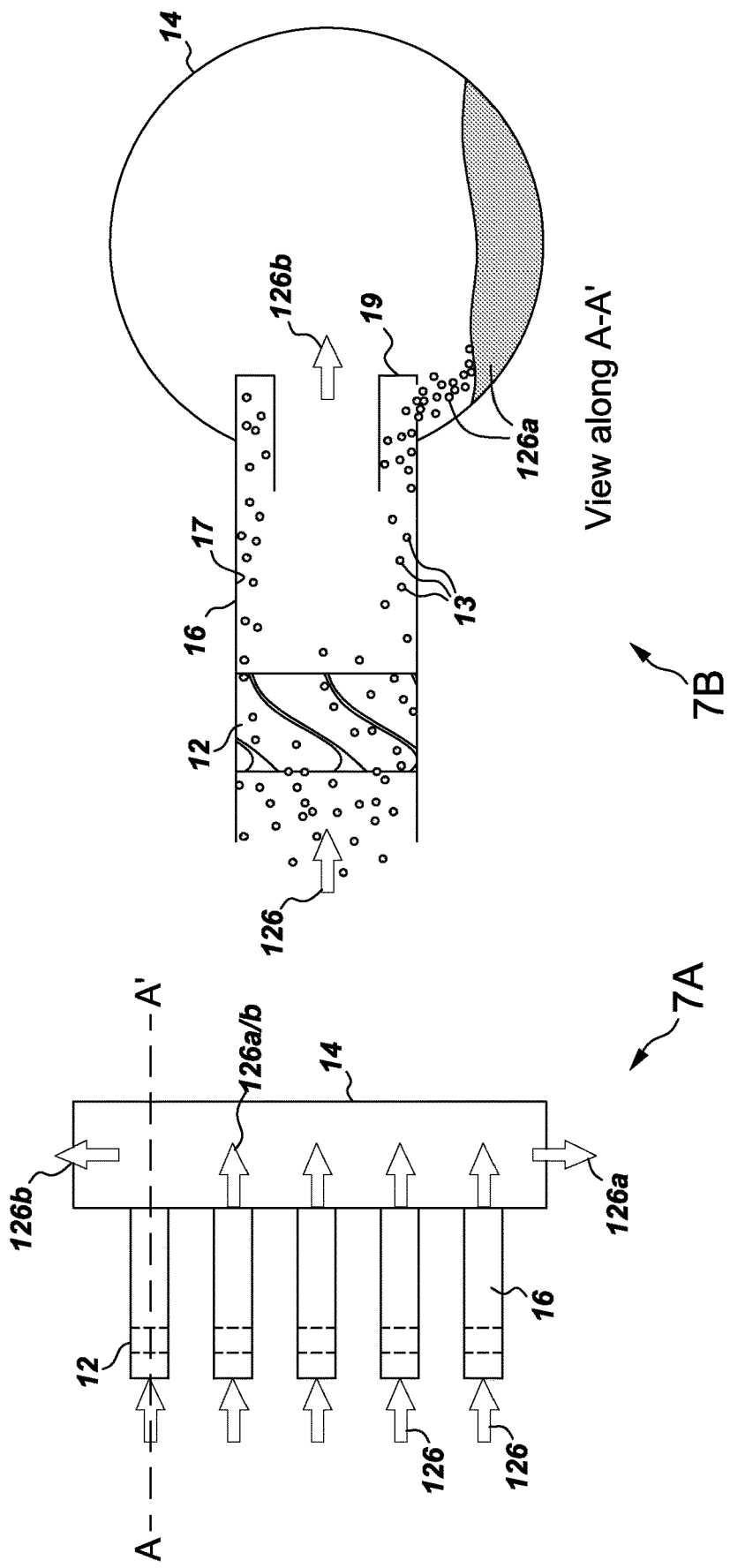
FIG. 7 illustrates a schematic view of an energy dissipating device component of a fluid processing system in accordance an exemplary embodiment of the present invention.

Referring to FIG. 7, the figure represents two views of a portion of an energy dissipating device according to one or more embodiments of the present invention. The view on the left designated 7A represents an overhead view of a portion of an energy dissipating device comprising an inlet header (not shown), an outlet header 14, a plurality of heat exchange tubes 16, and a plurality of passive gas-liquid separators 12 disposed within the heat exchange tubes. In the embodiment shown, the passive gas-liquid separators 12 are cyclonic separators. During operation, secondary fluid stream 126 enters heat exchange tubes 16 via inlet header 10 (not shown in FIG. 7) and is cooled by heat exchange with a cold ambient subsea environment. Heat depleted secondary fluid stream 126 encounters cyclonic separators 12 and is separated into a first portion 126a of the secondary fluid stream enriched in condensed components of stream 126, and a second portion 126b depleted in condensed components of stream 126 and enriched in gaseous components thereof. It remains to segregate streams 126a and 126b from one another.

Still referring to FIG. 7, the view on the right designated 7B represents a view of a portion of the energy dissipating device along axis A-A'. During operation cyclonic separator 12 directs condensed components (designated by the droplets 13 and element number 126a) toward the inner walls 17 of the heat exchange tubes 16 while non-condensed components 126b are directed along the center of heat exchange tubes. Entering outlet header 14 condensed stream 126a collects and flows under the influence of one or more flow biasing baffles 19 and gravity toward one end of the outlet header 14 while stream 126b flows through the outlet header in the opposite direction. Those of ordinary skill in the art will understand that the outlet header 14 may be appropriately biased and engineered to achieve this separation of streams 126a and 126b (See again, view 7A). Alternate configurations are possible and include embodiments wherein one or more of stream 126a and 126b are actively pumped or compressed. In one or more embodiments, streams 126a and 126b exit the outlet header at one or more locations along the length of the outlet header.

Figure 8:
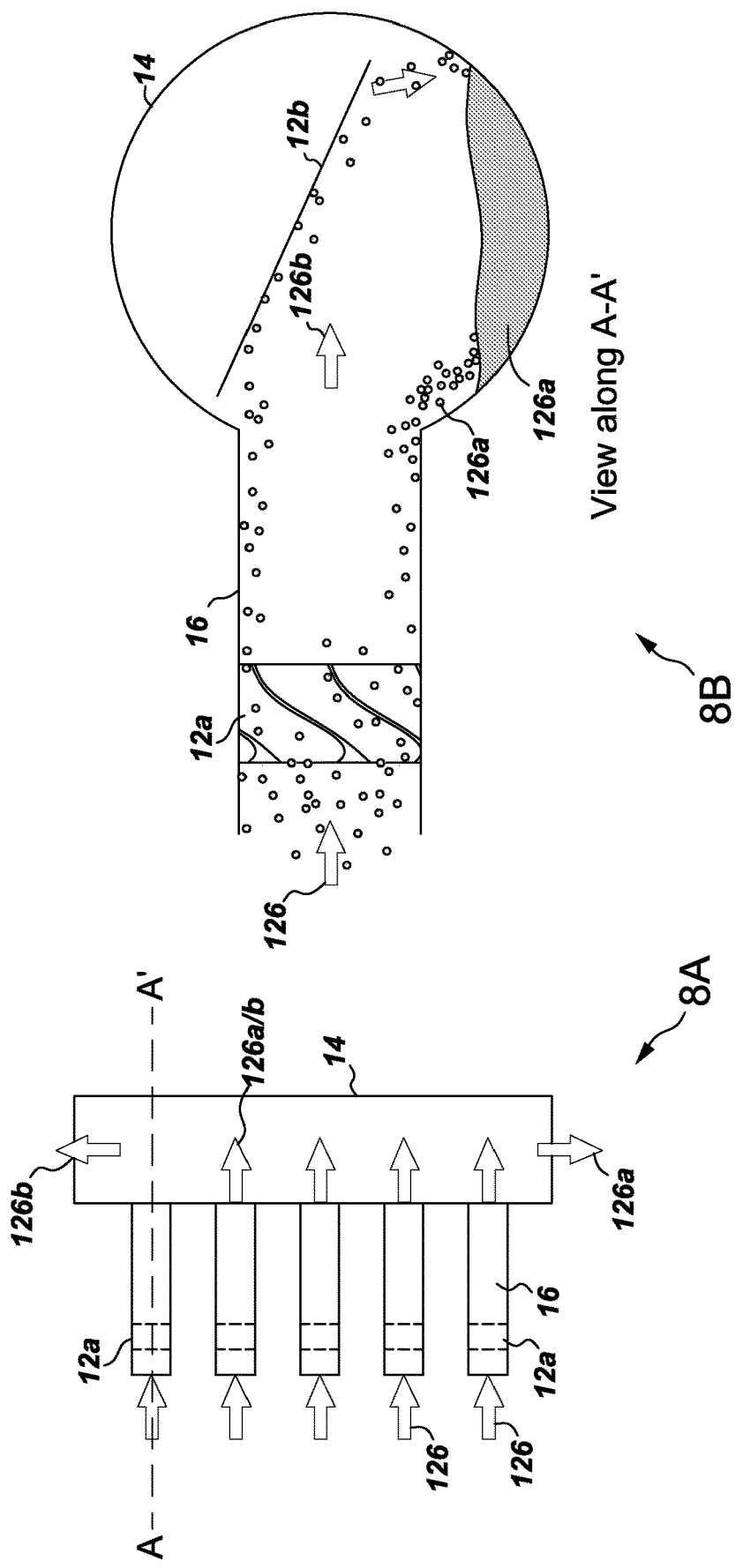
FIG. 8 illustrates a schematic view of an energy dissipating device component of a fluid processing system in accordance an exemplary embodiment of the present invention.

Referring to FIG. 8, the figure represents two views, an overhead view 8A and a view 8B along axis A-A', of a portion of an energy dissipating device configured as in in FIG. 7 with the exception that the outlet header 14 also comprises one or more passive gas-liquid separators configured as a splash plate 12b. Thus, in the embodiment shown one or more passive gas-liquid separators are disposed within both the heat exchange tubes and the outlet header 14. Again, those of ordinary skill in the art will understand that the outlet header 14 may be appropriately biased and engineered to achieve this separation of streams 126a and 126b (See again, view 8A). In one or more embodiments, stream 126b may be used advantageously to control the temperature of one or more system components.

Figure 9:
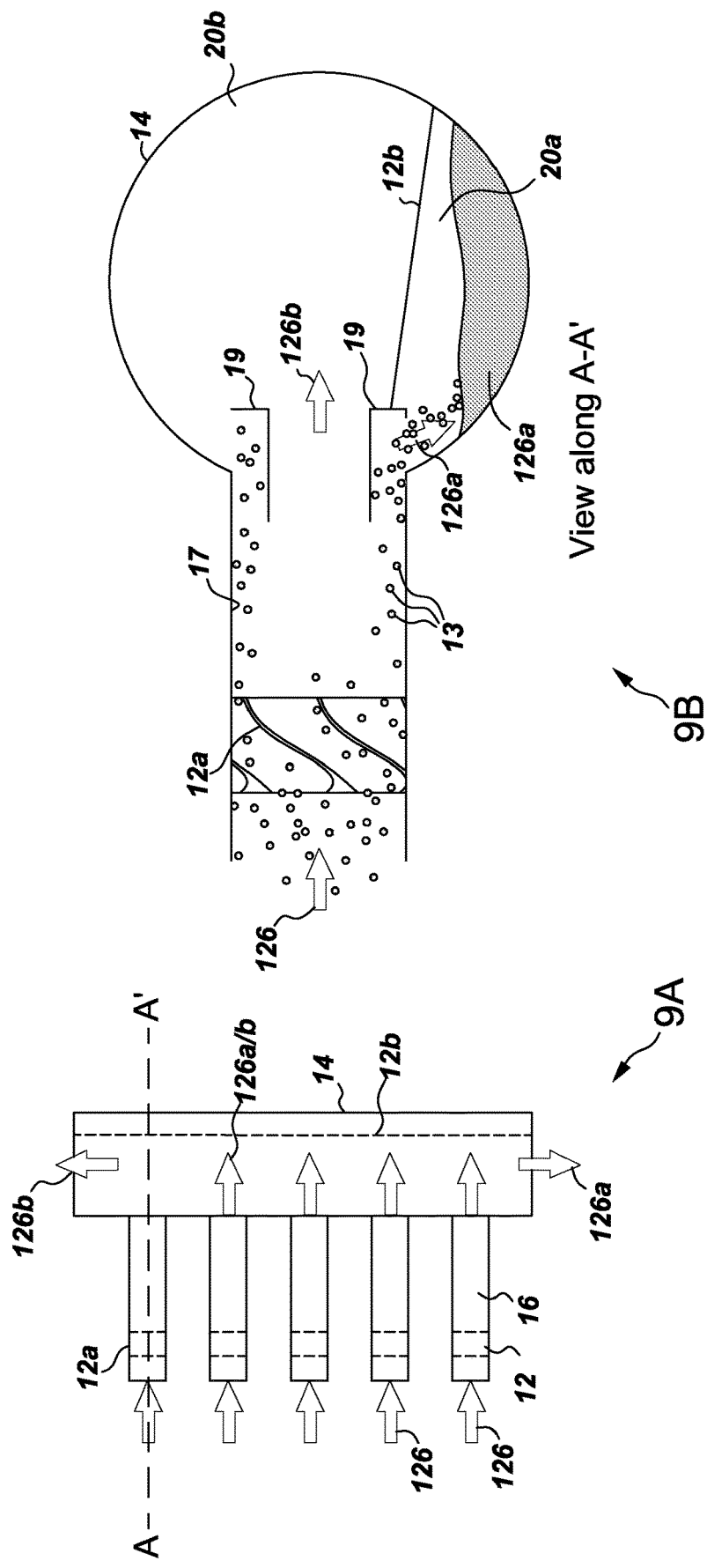
FIG. 9 illustrates a schematic view of an energy dissipating device component of a fluid processing system in accordance an exemplary embodiment of the present invention.

Referring to FIG. 9, the figure represents two views, an overhead view 9A and a view 9B along axis A-A', of a portion of an energy dissipating device configured as in in FIG. 7 with the exception that the outlet header 14 also comprises a passive gas-liquid separator which configures the outlet header as a fully divided pipe. In the embodiment shown, each of the heat exchange tubes 16 has disposed within it a cyclonic separator 12a, while the outlet header 14 comprises a divider 12b which subdivides outlet header 14 into upper and lower portions, both in fluid communication with the interior of heat exchange tube 16. As in FIG. 7, cyclonic separator 12a causes the first portion 126a rich in condensed components of secondary fluid stream 126 to flow along the inner walls 17 of the heat exchange tube, where at the connection to outlet header 14 stream 126a flows into the lower conduit portion 20a of the outlet header aided by one or more flow biasing baffles 19. As in the embodiment shown in FIG. 7, cyclonic separator 12a directs the second portion 126b rich in gaseous components of secondary fluid stream 126 to flow along the center axis of the heat exchange tube. The energy dissipating device is configured such that flow along the central axis of the heat exchange tube is directed into the upper conduit portion 20b of the outlet header. Again, those of ordinary skill in the art will understand that the outlet header 14 may be appropriately biased and engineered to achieve the separation of streams 126a and 126b (See again, view 9A). In one or more embodiments, stream 126b may be used advantageously to control the temperature of one or more system components.

Figure 10:
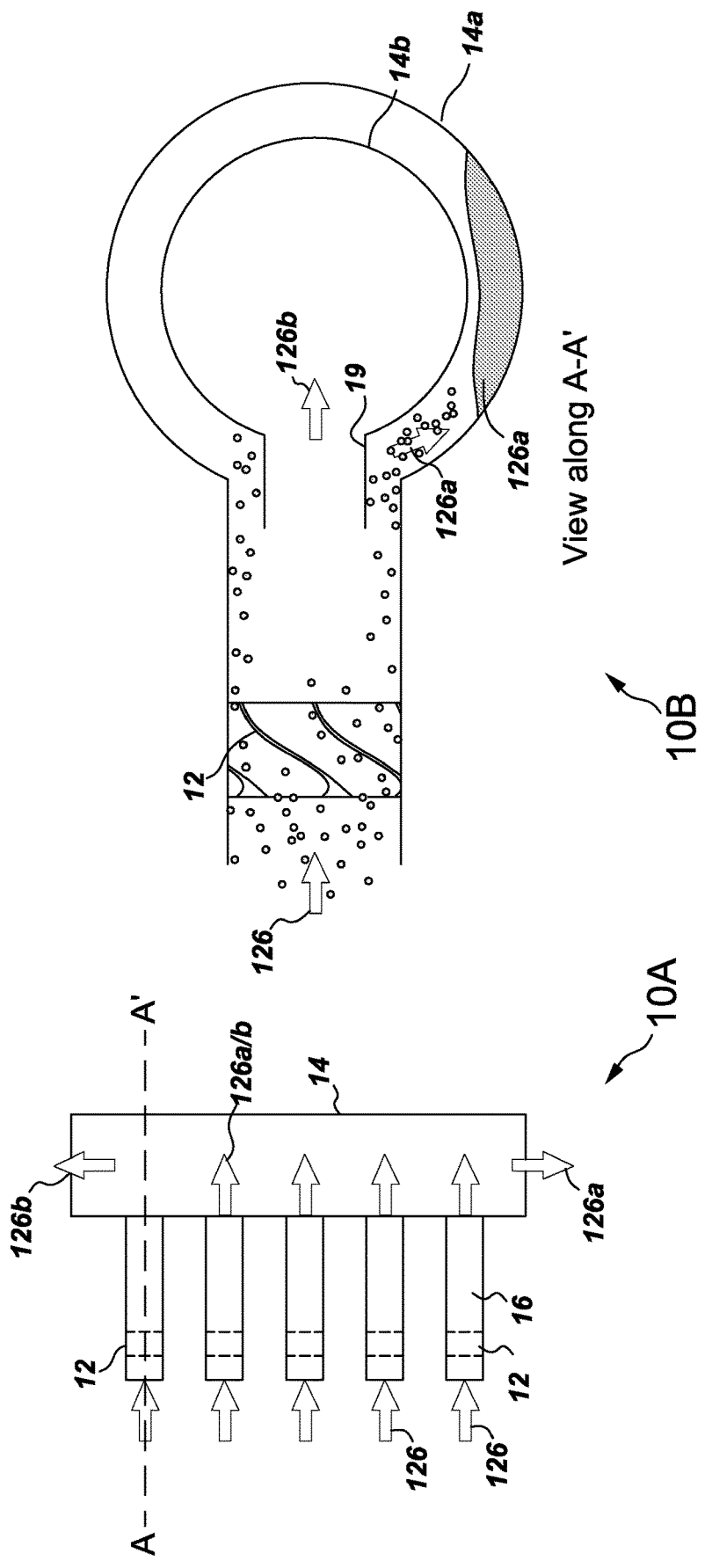
FIG. 10 illustrates a schematic view of an energy dissipating device component of a fluid processing system in accordance an exemplary embodiment of the present invention.

Referring to FIG. 10, the figure represents two views, an overhead view 10A and a view 10B along axis A-A', of a portion of an energy dissipating device configured as in in FIG. 7 with the exception that the outlet header 14 also comprises one or more passive gas-liquid separators configured as a pipe within a pipe separator. Thus, in the embodiment shown, one or more passive gas-liquid separators are disposed within both the heat exchange tubes and the outlet header 14. Again, those of ordinary skill in the art will understand that the outlet header 14 may be appropriately biased and engineered to achieve the separation of streams 126a and 126b (See again, view 10A). In one or more embodiments, stream 126b may be used advantageously to control the temperature of one or more system components.

Figure 11:
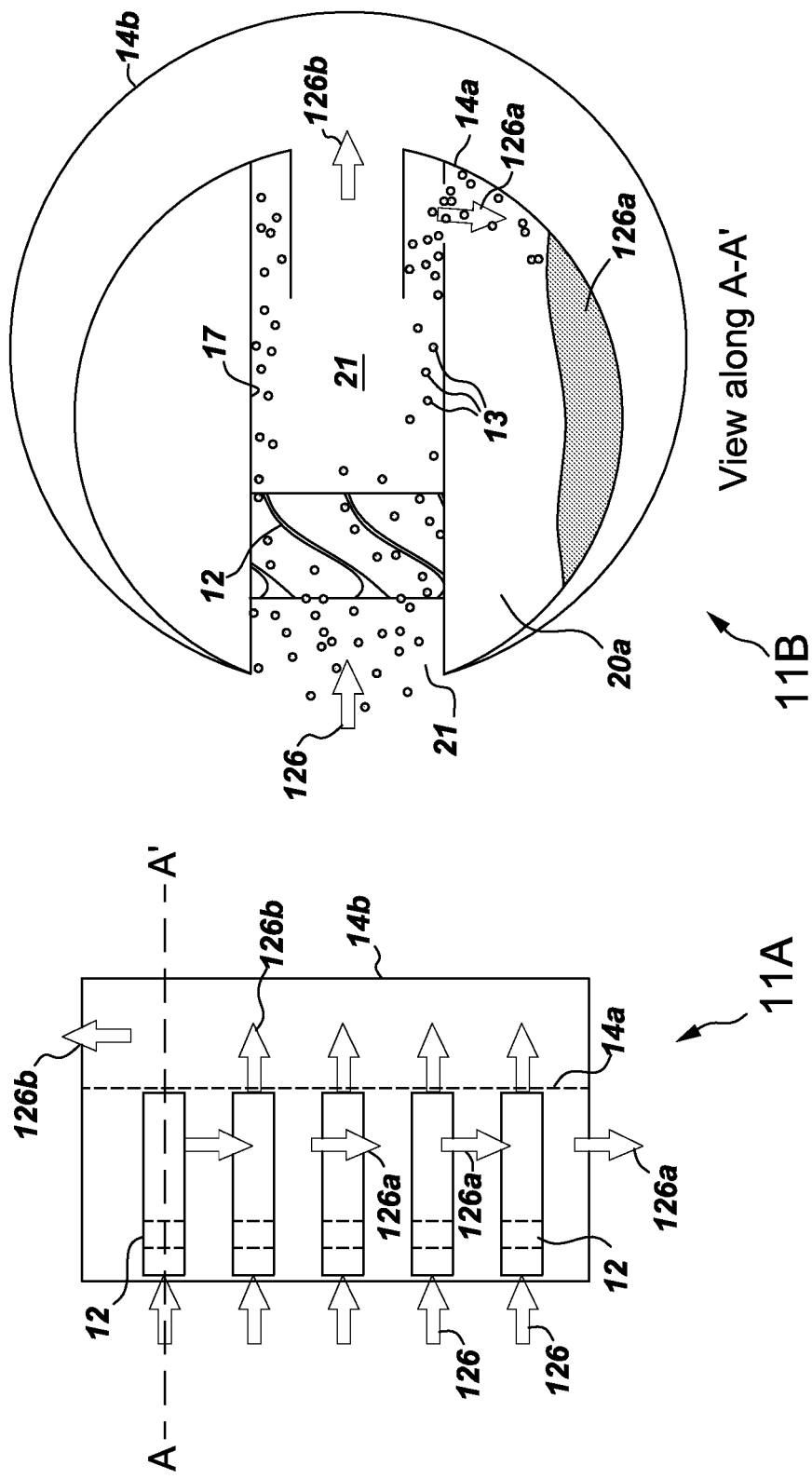
FIG. 11 illustrates a schematic view of an energy dissipating device component of a fluid processing system in accordance an exemplary embodiment of the present invention.

Referring to FIG. 11, the figure represents two views, an overhead view 11A and a view 11B along axis A-A', of a portion of an energy dissipating device configured as in in FIG. 10 with the exception that the outlet header 14 comprises one or more passive gas-liquid separators 12. In one or more embodiments, the passive gas-liquid separator is a cyclonic separator. In the embodiment shown, outlet header 14 is configured as an eccentric pipe within a pipe (14a within 14b) in which a first component 14a of the outlet header defines a flow channel 21 in which is disposed a passive gas-liquid separator 12, and a lower outlet header conduit portion 20a into which condensate rich stream 126a is directed. Passive gas-liquid separator 12 directs condensate depleted stream 126b into a second component 14b of the outlet header. Again, those of ordinary skill in the art will understand that the outlet header 14 may be appropriately biased and engineered to achieve the separation of streams 126a and 126b (See again, view 11A). In one or more embodiments, stream 126b may be used advantageously to control the temperature of one or more system components.

Figure 12:
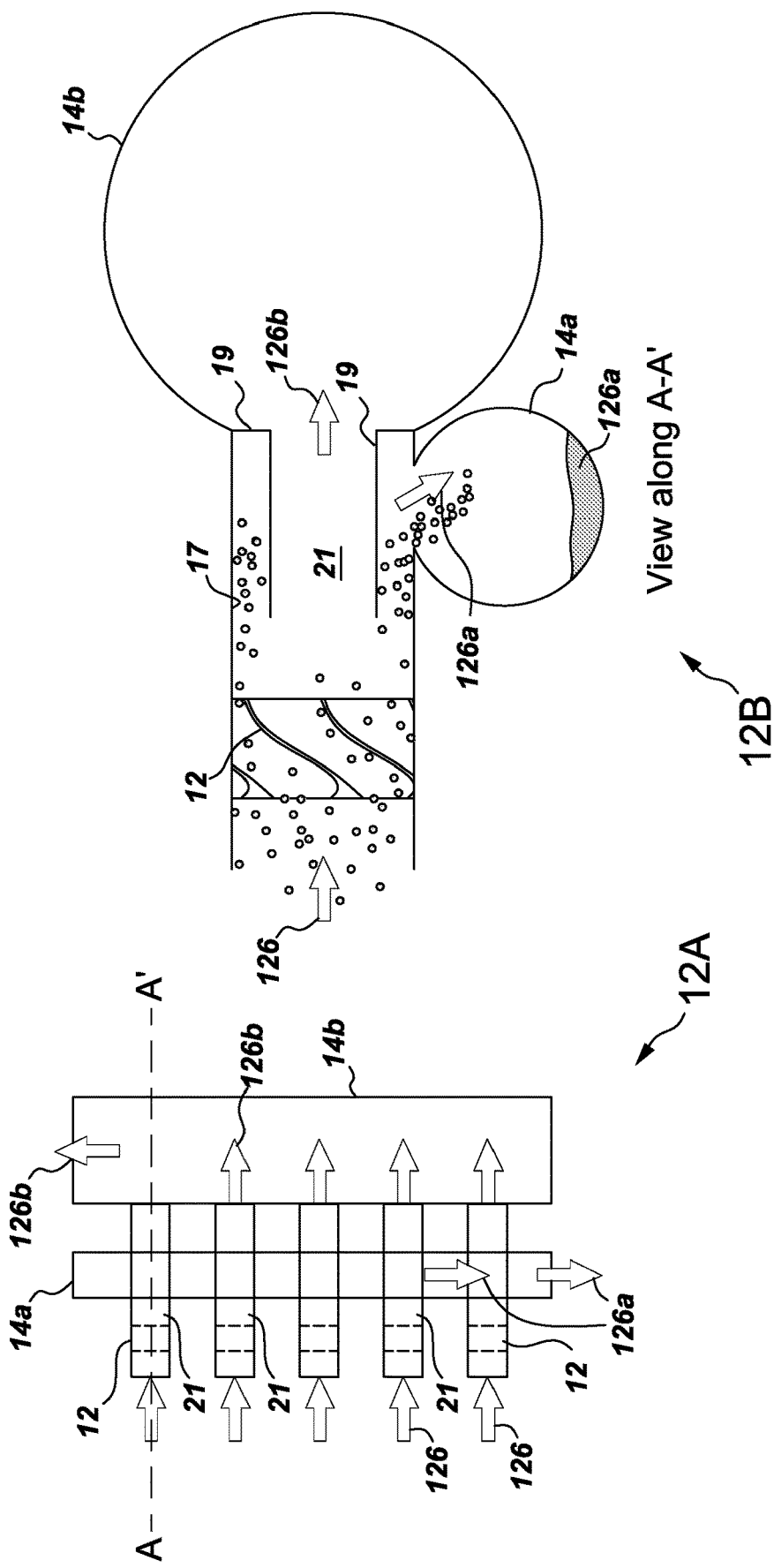
FIG. 12 illustrates a schematic view of an energy dissipating device component of a fluid processing system in accordance an exemplary embodiment of the present invention.

Referring to FIG. 12, the figure represents a portion of an energy dissipating device according to one or more embodiments of the present invention. In the embodiment shown, a series of heat exchange tubes 16 are linked to an outlet header 14 having two components 14a and 14b which are essentially two conduits in fluid communication with each of heat exchange tubes 16. Two views are given; an overhead view 12A and a view 12B along axis A-A' of the illustrated portion of the energy dissipating device. In the embodiment shown, each heat exchange tube 16 comprises a passive gas-liquid separator disposed within a flow channel 21 defined by the heat exchange tube. The passive gas-liquid separator 12 causes condensate rich stream 126a separated from the secondary fluid stream 126 to flow primarily along the inner walls 17 of the heat exchange tube downstream of the passive gas-liquid separator. One or more flow biasing baffles 19 directs stream 126a into the outlet header first conduit 14a through which it may flow until it exits the energy dissipating device. Simultaneously, passive gas-liquid separator 12 causes condensate depleted stream 126b to flow primarily along the central axis of the heat exchange tube and into outlet header second conduit 14b. Again, those of ordinary skill in the art will understand that the outlet header 14 may be appropriately biased and engineered to achieve this separation of streams 126a and 126b (See again, view 12A)

Figure 13:
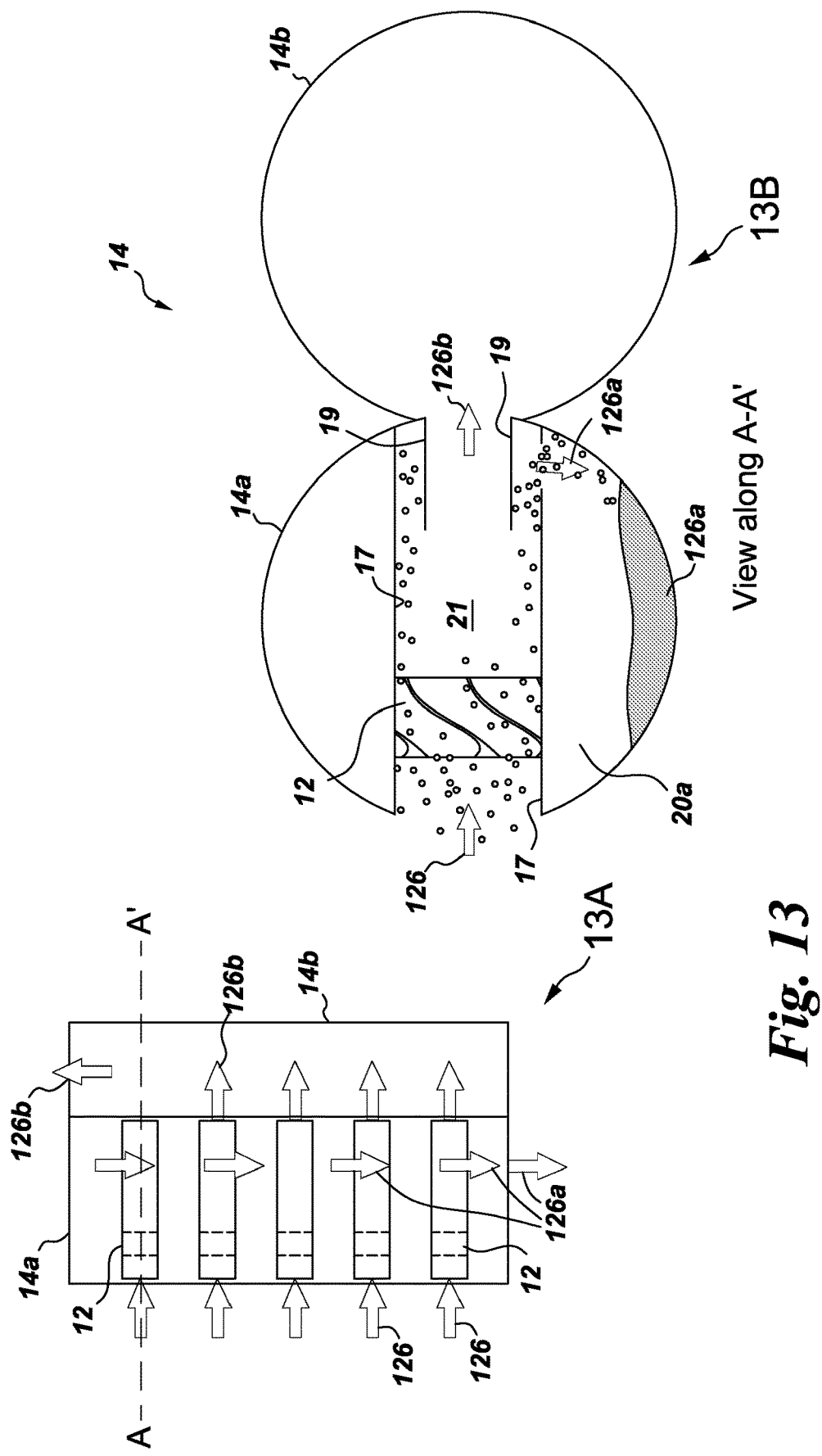
FIG. 13 illustrates a schematic view of an energy dissipating device component of a fluid processing system in accordance an exemplary embodiment of the present invention.

Referring to FIG. 13, the figure represents a portion of an energy dissipating device according to one or more embodiments of the present invention. In the embodiment shown, a series of heat exchange tubes 16 (not shown in FIG. 13) are linked to an outlet header 14 having two components 14a and 14b which are essentially two adjacent conduits in fluid communication with each of heat exchange tubes 16. Two views are given; an overhead view 13A and a view 13B along axis A-A' of the illustrated portion of the energy dissipating device. In the embodiment shown, the first outlet header component 14a defines one or more flow channels 21 containing at least one passive gas-liquid separator 12. The passive gas-liquid separator 12 causes condensate rich stream 126a to separate from the secondary fluid stream 126 and to flow primarily along the inner walls 17 defining the flow channel downstream of the passive gas-liquid separator. One or more flow biasing baffles 19 directs stream 126a into the lower conduit portion 20a of outlet header component 14a through which it may flow until it exits the energy dissipating device. Simultaneously, passive gas-liquid separator 12 causes condensate depleted stream 126b to flow primarily along the central axis of the flow channel 21 and into outlet header second conduit 14b. Again, those of ordinary skill in the art will understand that the outlet header 14 may be appropriately biased and engineered to achieve this separation of streams 126a and 126b (See again, view 12A)

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A fluid processing system comprising: a compressor configured to receive a hot fluid comprising condensable and noncondensable components, and produce therefrom a primary compressed fluid stream and a secondary fluid stream; a motor configured to drive the compressor, the motor being configured for ingress and egress of the secondary fluid stream; a secondary fluid re-circulation loop configured to control an operating temperature of the motor, the secondary fluid re-circulation loop comprising a first energy-dissipating device which receives the secondary fluid stream from the motor and is configured to remove excess heat from the secondary fluid stream, the first energy dissipating device comprising (i) an inlet header, (ii) an outlet header, (iii) a plurality of heat exchange tubes, and (iv) at least one passive gas-liquid separator, wherein a first portion of the secondary fluid stream in the secondary fluid re-circulation loop is discharged from the first energy-dissipating device via a purge line, and a second portion of the secondary fluid stream in the secondary fluid recirculation loop is returned from the first energy-dissipating device to the motor, the first portion of the secondary fluid stream comprising a higher level of condensation components relative to the second portion of the secondary fluid stream; a fluid conduit configured to receive the primary compressed fluid stream from the compressor.

2. The fluid processing system according to claim 1, wherein one or more passive gas-liquid separators are disposed within the heat exchange tubes.

3. The fluid processing system according to claim 1, wherein one or more passive gas-liquid separators are disposed within the outlet header.

4. The fluid processing system according to claim 1, wherein the first energy-dissipating device comprises a cyclonic gas-liquid separator.

5. The fluid processing system according to claim 1, wherein the first energy dissipating device comprises a splash plate separator.

6. The fluid processing system according to claim 1, wherein the outlet header is configured as a single pipe outlet header.

7. The fluid processing system according to claim 6, wherein the outlet header comprises a splash plate separator.

8. The fluid processing system according to claim 6, wherein the outlet header is configured as a divided pipe outlet header.

9. The fluid processing system according to claim 1, wherein the outlet header is configured as a pipe within a pipe outlet header.

10. The fluid processing system according to claim 1, wherein the outlet header is configured as a parallel pipe outlet header.

11. The fluid processing system according to claim 1, wherein the compressor is arranged outside of the secondary fluid re-circulation loop.

12. The fluid processing system according to claim 1, wherein one or more passive gas-liquid separators are disposed within the heat exchange tubes and one or more passive gas-liquid separators are disposed within the outlet header.

13. A method comprising: introducing a hot fluid comprising condensable and non-condensable components into a compressor to produce a primary compressed fluid stream and a secondary fluid stream; feeding the secondary fluid stream from the compressor to a motor configured to drive the compressor, to control an operating temperature of the motor; circulating the secondary fluid stream in a secondary fluid re-circulation loop, the secondary fluid re-circulation loop comprising an energy-dissipating device which receives the secondary fluid stream from the motor and is configured to remove excess heat from the secondary fluid stream, the first energy dissipating device comprising (i) an inlet header, (ii) an outlet header, (iii) a plurality of heat exchange tubes, and (iv) at least one passive gas-liquid separator; re-circulating a second portion of the secondary fluid stream in the secondary fluid re-circulation loop from the energy dissipating device to the motor, and discharging a first portion of the secondary fluid stream in the secondary fluid re-circulation loop from the energy-dissipating device via a purge line, wherein the first portion of the secondary fluid stream comprises a higher level of condensation components relative to the second portion of the secondary fluid stream; and transporting the primary compressed fluid stream from the compressor to a fluid storage facility via a fluid conduit.

14. The method according to claim 13, wherein one or more passive gas-liquid separators are disposed within the heat exchange tubes and one or more passive gas-liquid separators are disposed within the outlet header.

* * * * *